Oct. 9, 1962  J. P. CARLTON  3,057,411
EDGER ATTACHMENT
Filed Jan. 15, 1957
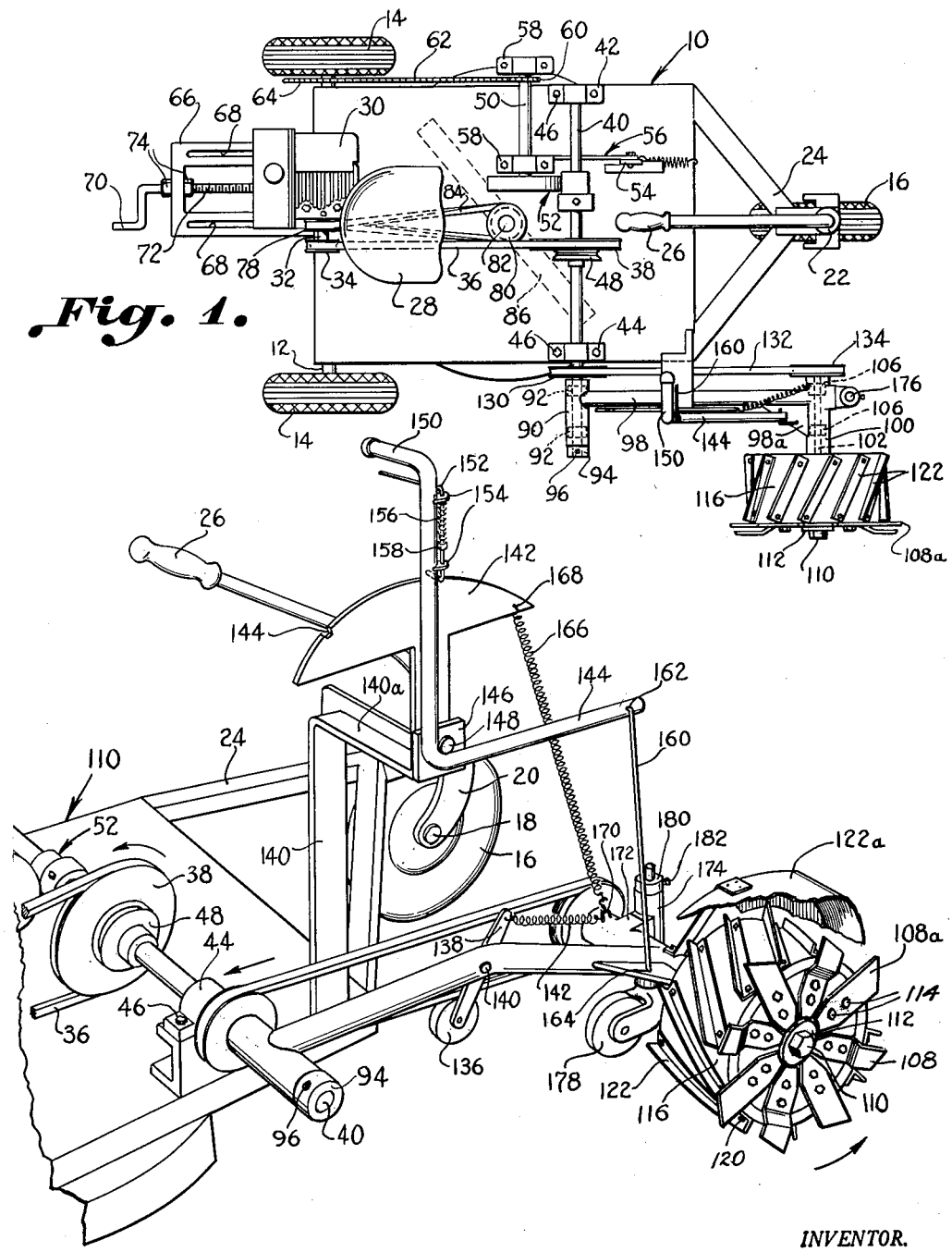
Fig. 1.
Fig. 2.
INVENTOR.
JOHN P. CARLTON
BY
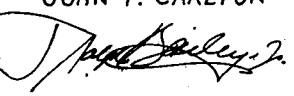
ATTORNEY 3,057,411
Patented Oct. 9, 1962

3,057,411
EDGER ATTACHMENT
John P. Carlton, 771 Duncan Park Drive,
Spartanburg, S.C.
Filed Jan. 15, 1957, Ser. No. 634,339
1 Claim. (Cl. 172—15)

This invention relates to power driven lawn mowers and more specifically to an edger attachment and drive.

Edging has formerly been done by hand or by machines having relatively small engines and which were constructed for carrying out only small amounts of edging. Generally these edgers have been driven from a direct drive which necessitated a relatively high speed of operation of the edger and only permitted the use of relatively small motors because larger motors would produce excessive speed of rotation of the edger. Steering of mowers to which edgers are attached is accomplished only with great difficulty since movement of the mower steering mechanism does not produce responsive steering of the edger. This is because edger is not in transverse alignment with the axis of the wheel which accomplishes such steering. Hence it has been impossible to build a machine that is heavy enough and strong enough to carry out a relatively large edging operation such as along the edge of a highway.

Accordingly, it is an object of this invention to provide an edger which may be driven by an indirect drive so that a relatively large motor may be employed to drive the edger and at a relatively low speed of rotation and at the same time permit adjustments in the height of the edger to be made.

Another object of this invention is to provide an edger which is positioned in alignment with the front wheel of the machine so as to make guiding of the edger directly responsive to guiding of the machine.

Another object of the invention is to provide an edger attachment for a mower which may be constructed of relatively sturdy parts and which may be attached and taken off the mower with relative ease.

While some of the objects have been stated above, others will become apparent to those skilled in the art relating to lawn mowers when the specification is read in connection with the accompanying drawing in which:

FIGURE 1 is a plan view showing an edger attachment, constructed in accordance with the present invention operably associated with a power driven lawn mower, and FIGURE 2 is an enlarged perspective view of the edger looking from the lower rear of the device shown in FIGURE 1.

Referring more particularly to the drawing, the frame or body portion of a power driven mower is broadly designated at 10. This frame or chassis 10 is supported at the rear by rear wheels 14 which are carried by the shaft 12, and is supported at the front by a front wheel 16 which is rotatably mounted on the shaft 18. The shaft 18 is carried by a bifurcated member 20 which is oscillatably mounted within suitable bearings 22 carried by a forwardly projecting portion 24 of the chassis 10. This bifurcated member 20 is adapted to be manually turned or oscillated with respect to the chassis by the handle bar 26.

It will be noted that the mower is controlled manually by an operator who is carried by the mower and is seated on the seat 28 provided for that purpose. A suitable motor for driving the various parts, which is preferably gasoline driven, is shown at 30. The motor 30 is provided with power take off means in the form of a stub shaft 32. A pulley 34 is fixedly mounted adjacent the end of the stub shaft at 32 and through the belt 36 drives a pulley 38 which is fixedly mounted on a counter shaft 40. The counter shaft 40 is rotatably positioned in suitable bearings 42 and 44 which are secured as by bolts 46 adjacent the sides of the chassis 10. It will be noted that a pulley 48 which is smaller than the pulley 38 is mounted closely adjacent the pulley 38 on the shaft 40.

A shaft 50 which is disposed in parallel relation to the shaft 40 is driven through a suitable clutch mechanism which is broadly designated at 52 and which is engaged and disengaged by manually operating the lever 54 which acts through suitable linkage 56 to engage and disengage the clutch elements 52. It should be noted at this point that the shaft 50 is rotatably mounted adjacent its end in the brackets 58 which are slidably positioned on the chassis 10 in any suitable manner (not shown) so that movement of the lever 54 acts through the linkage 56 to move the shaft 50 toward and away from the shaft 40. A sprocket 60 is fixedly carried by the shaft 50 and through the chain 62 drives the sprocket 64 which is fixedly mounted on the rear axle 12 in order to drive the axle 12 and provide power for moving the mower when the clutch elements 52 are engaged.

The motor 30 is mounted on a suitable bracket 66 which is secured to the rear of the chassis 10. A pair of parallel slots 68 are provided in the bracket and serve as guides for the motor which is adjusted by turning the handle 70 thus turning the threaded element 72 in the bolts 74 which are secured to the bracket 66. The power take off or stub shaft 32 is provided with a second pulley 78 which is fixed to the shaft 32 between the pulley 34 and the motor. This pulley 78 drives a pulley 80 which is fixedly mounted on a shaft 82, through the twisted belt 84. The shaft 82 is rotatably mounted in suitable bearings not shown within the chassis 10 and the mower blade 86, centrally disposed with respect to the chassis, is fixedly carried thereby. The mower blade 86 is thus driven directly off the shaft 32.

It is to be noted at this point that the pulley 48 which is carried by the shaft 40 is employed when the edger attachment, which forms an important part of this invention, is employed. This is to make it possible to operate the edger and the entire machine at a greater speed. A housing or tubular element 90 is carried by the end of the shaft 40, which projects beyond the edge of the chassis 10, and is rotatably mounted thereon by suitable bearings 92. The housing 90 is confined on the shaft 40 by the collar 94 which is fixed by the set screw 96. A forwardly projecting element 98 projects forwardly from the housing 90 and is suitably secured thereto as by welding. A second housing or tubular element 100 is suitably secured to the forward end of the element 98 as by welding in parallel relation to the housing 90. A stub shaft or axle 102 is rotatably carried therein. The axle 102 is rotatably mounted as by suitable bearings 106.

An edger blade, including a plurality of elongated elements which are alternately bent outwardly as at 108, is positioned adjacent the outer end and in fixed relation to the axle 102. It will be noted that alternately spaced blades 108a are included and together with the outwardly bent blades 108 are secured to a drum 116 as by bolts 114. This drum 116 is fixedly mounted on the axle 102 by the nut 110 and the washer 112. The drum 116 is provided with a plurality of angle irons 122 to form tread elements. These tread elements 122 are secured to the drum by any suitable means such as bolts 120.

A pulley 130 is fixedly mounted on the shaft 40 between the housing 90 and the frame and through the belt 132 drives a pulley 134 which is fixedly mounted adjacent the inner end of the shaft 102 so as to drive the edger blades 108 and 108a. An idler pulley 136 is provided to take up the slack in the belt 102 and is rotatably mounted on one end of the link 138 which is pivoted in the medial portion thereof on the forwardly extending element 98 as at 140. The free end of the link 138 is normally urged downwardly by the coil spring 142 which is connected on one end to the link 140 and on the other end to the second tubular housing 100.

Means are provided for adjustably positioning the edger blades 108 and 108a by pivoting the entire attachment about the counter shaft 40. A vertical supporting element 140 having an outwardly projecting portion 140a at the top thereof is provided for supporting an arcuate selector element 142 having a plurality of notches 144 therein. An angular link 144 is fixed to the plate 146 as by welding and the plate 146 is in turn pivoted as at 148 on the forwardly projecting support element 140a. An inwardly projecting handle 150 is provided at the upper end of the angular member 144.

An engaging element in the form of a bent rod 152 is slidably positioned within a pair of brackets projecting from the angular member 144 as at 154. The engaging element 152 is normally urged downwardly by the coil spring 156 which pushes downwardly against an abutment 158 fixedly carried by the engaging element 152. It will be noted that the engaging element may be manually released and the angular element pulled backwardly by the handle 150 so that the attachment may be raised or lowered through the angular linkage 144 and the link 160 which is pivoted on one end to the angular linkage 144 as at 162 and to the re-enforcing plate 98a as at 164. The raising of the attachment is facilitated by the coil spring 166 which is secured on one end to the arcuate selector element 142 as at 168 and to the second tubular housing 100 as at 170. A bracket 172 is fixedly secured on the forward portion of the second housing 100 and carries a vertical housing 174 which rotatably supports a shaft 176. The shaft 176 carries a caster 178 and the height of the caster is adjusted by the collar 180 and the set screw 182.

It will be noted that the shaft 102 is in alignment with the shaft 18 on which the front wheel is rotatably mounted. This facilitates steering so that movement of the front wheel by the handle bar 26 produces directly responsive movement of the cutter blades 108. It will be further noted that the edger blades 108 are turned in the direction of the arrow in FIGURE 2. This prevents the throwing of stone and the like by the blades and results in the edger blade cutting easier. When the edger attachment is in operation the mower blade is disconnected by removing the belt 84 from its connection with pulleys 78 and 80. The belt 36 is placed on the small pulley 48 so that the entire apparatus will operate at faster speed. The position of the motor may be adjusted as described above by turning the crank 70 to adjust the tightness of the drive belts. The entire edger attachment may be removed by loosening the set screws 96.

It is thus seen that there has been provided an edger which is adapted to be used with a machine which is heavy enough and which has power enough to do large amounts of edging work. By driving the edger from the counter shaft it is possible to reduce the speed at which the edger turns so that it does a better job with less danger of throwing rocks and produces less wear on the various parts. The cross blades which make up the edger blade may be readily changed to accommodate blades producing a wider trench. It is particularly noted that the height of the blade may be adjusted without adjusting the drive means.

While a preferred embodiment of the invention has been described using specific terms, such description is for illustrative purposes only, and it is to be understood that changes and variations may be made without departing from the spirit or scope of the following claim.

I claim as my invention:

In a power driven lawn mower of the type having a substantially horizontal chassis, a power unit supported on said chassis, a rear ground-engaging wheel rotatably supported along each longitudinal side of said chassis, a blade rotatably supported beneath said chassis, an operator seat supported above said chassis, means to connect said blade to said power unit, a fork disposed at the front of said chassis and supported by and for pivotal movement about a vertical axis which intersects the longitudinal center axis of said chassis, a ground-engaging steering wheel supported by said fork for rotation about a horizontal axis and pivotal with said fork to either side of a straight ahead plane, which said wheel defines when said horizontal axis is perpendicular to said longitudinal center axis of said chassis, and an operator steering arm affixed to said fork and extending to the vicinity of said seat, that improvement comprising: a drive shaft rotatably supported transversely of said chassis, power transfer means between said power unit and said drive shaft for driving said shaft, a shaft extension extending outwardly beyond one longitudinal side of said chassis, a housing pivotally secured about said extension and having a portion extending forwardly thereof, a second shaft parallel to said drive shaft and rotatably supported in said portion, drive means between said shaft extension and said second shaft, a cutting element driven by said second shaft, and a linkage connected to said housing and extending to the vicinity of said seat for pivoting said housing about said extension to raise and lower said cutting element, wherein an extension of the central axis of said second shaft passes through said horizontal axis about which said steering wheel rotates when said wheel is in said straight ahead plane and said housing is substantially horizontal.

References Cited in the file of this patent

UNITED STATES PATENTS

| | | |
|---|---|---|
| 2,176,261 | Kelsey | Oct. 17, 1939 |
| 2,521,033 | Bell | Sept. 5, 1950 |
| 2,538,230 | Boggs | Jan. 16, 1951 |
| 2,614,473 | Yacoby | Oct. 21, 1952 |
| 2,618,919 | Hutchens | Nov. 25, 1952 |
| 2,620,612 | De Eugenio | Dec. 9, 1952 |
| 2,643,503 | Noyes | June 30, 1953 |
| 2,661,584 | Ronning | Dec. 8, 1953 |
| 2,721,432 | Machovec | Oct. 25, 1955 |
| 2,787,107 | Strasel | Apr. 2, 1957 |